Feb. 19, 1929.
L. A. HAZELTINE
1,702,402
METHOD AND APPARATUS FOR CONVERTING ELECTRIC POWER
Original Filed July 5, 1923 4 Sheets-Sheet 1
*Fig. 1.*
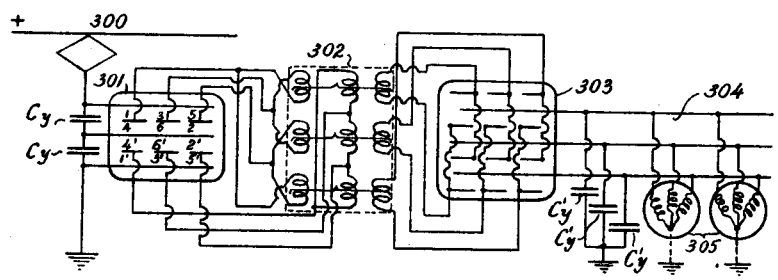
*Fig. 2.*
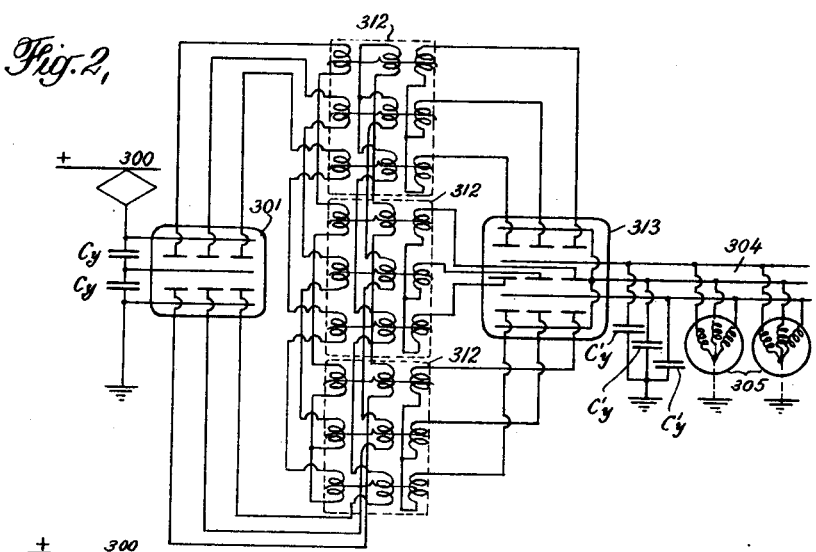
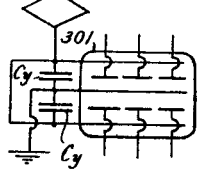
*Fig. 3.*
INVENTOR
Louis A. Hazeltine
BY
Pennie, Davis, Marvin and Edmonds,
ATTORNEYS

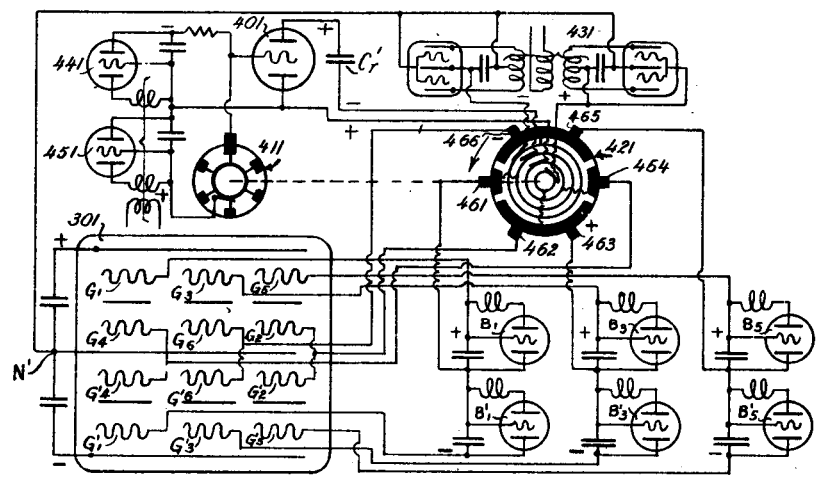
Fig. 4a,
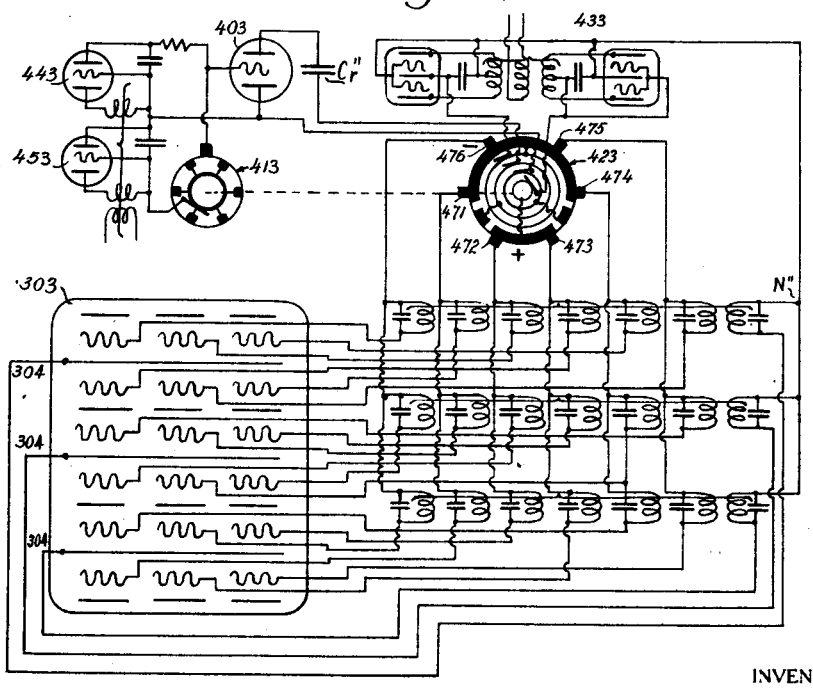
Fig. 4b,

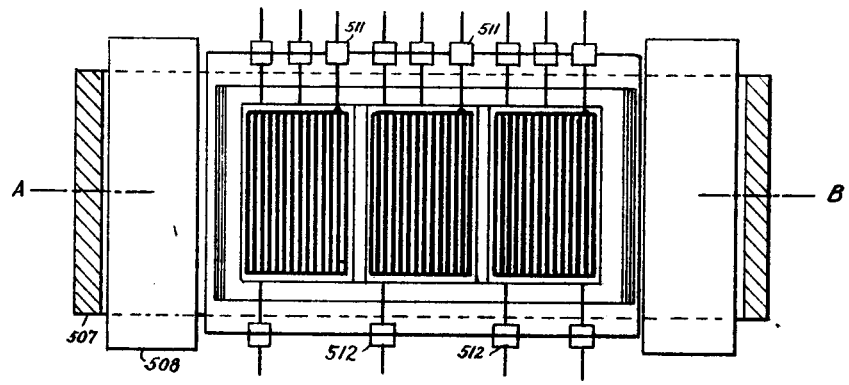
Fig. 5a,
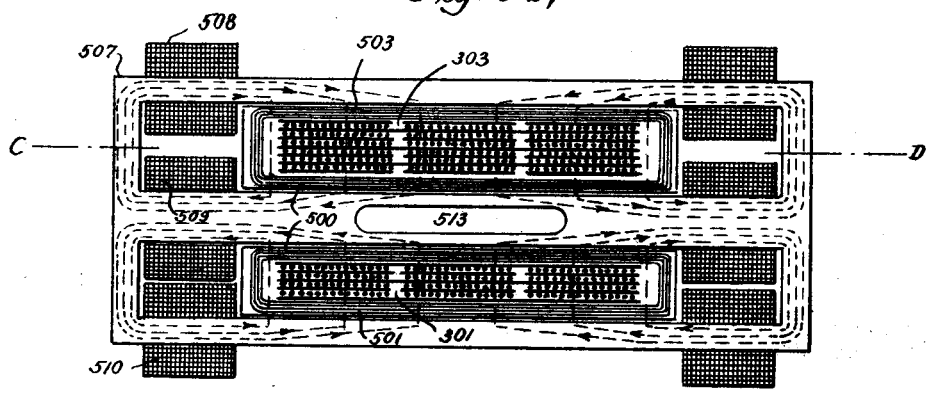
Fig. 5b,
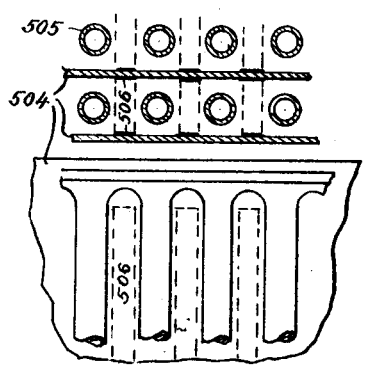
Fig. 6,

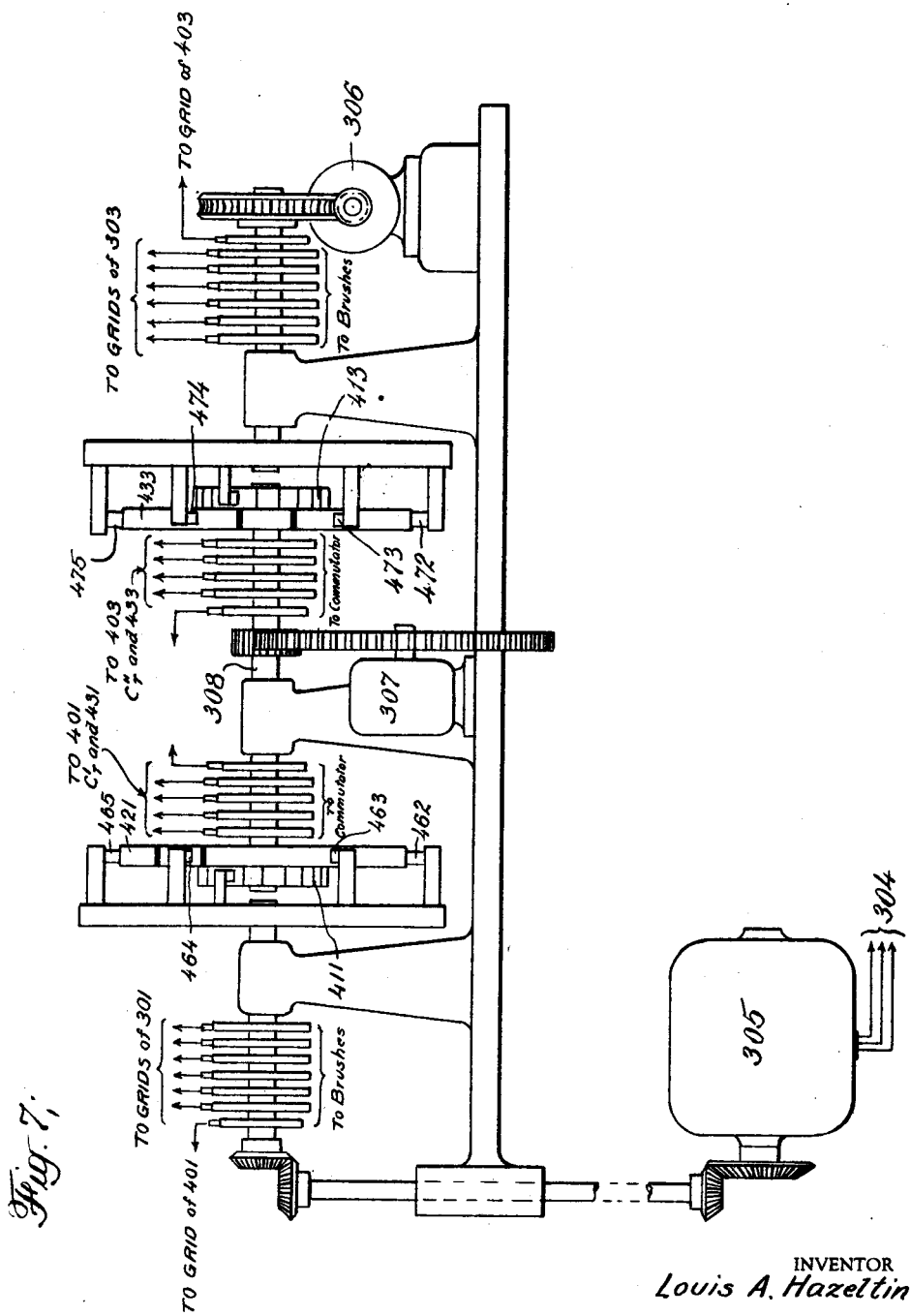

Patented Feb. 19, 1929.

1,702,402

UNITED STATES PATENT OFFICE.

LOUIS A. HAZELTINE, OF HOBOKEN, NEW JERSEY.

METHOD AND APPARATUS FOR CONVERTING ELECTRIC POWER.

Original application filed July 5, 1923, Serial No. 649,536, and in Great Britain July 4, 1924. Divided and this application filed January 20, 1927. Serial No. 162,237.

This invention relates to a method and apparatus for controlling the speed of alternating-current motors, particularly induction motors, operated through an electric valve converter. The various forms of circuit in which such a valve converter may be employed and the structure and arrangement of the valves are discussed in my patent application Serial No. 649,536, filed July 5, 1923, of which this is a division.

A specific application of the valve conversion of this invention is the operation of electric railways. The most desirable form of power transmission over considerable distances is by the use of three-phase alternating current, since alternating current is most easily transformed in voltage. The most desirable form of power for delivery to electric locomotives and cars is high-voltage direct-current, since this requires only a single contact conductor and avoids the interference with communication lines that is experienced with single-phase alternating current. The most desirable type of motor would be the polyphase squirrel-cage induction motor supplied with currents of adjustable frequency, since this motor has no sliding contacts and is most robust in construction, but requires variable frequency for efficient speed control. These conflicting demands for the form of power can be reconciled by the use of valve converters, first converting three-phase alternating-current into high-voltage direct current at substations and then converting the direct current into variable-frequency polyphase current on the locomotive or cars.

The direct conversion between direct current and low-frequency alternating current requires a very large number of valves unless the voltage-absorbing and current-absorbing coils and condensers are made large; moreover, the residual harmonics with a small number of valves would have a frequency within the audible range and would therefore be likely to cause interference with telephone circuits. Further, the form of valve which forms part of this invention is most suited to moderately high control frequency. For these reasons the conversions at the substations and on the electric locomotive or car are each made in two steps: at the substation the conversion is from low frequency to moderately high frequency and then from this high frequency to direct current; on the electric locomotive or car the conversion is the reverse, from direct current to moderately high frequency and from this high frequency to low variable frequency. These two conversions being the same in form, but reverse in sense, only the latter will be described in detail. On the electric locomotive all of the main circuit connections are permanent, thus avoiding heavy contacts and rheostat losses. The speed control is effected wholly by adjustments in the control electrode circuits, these electrodes being controlled ultimately through a commutator.

The accompanying drawings illustrate a preferred form of the invention and its application to a specific use, the speed control of traction motors; but the fundamental principles disclosed may be embodied in various ways and employed for various purposes.

Referring to these drawings,

Fig. 1 shows the main circuits of a preferred arrangement for employing electric valves to convert direct-current power in two steps into variable-frequency alternating-current power for operating squirrel-cage induction motors on an electric locomotive.

Fig. 2 shows an alternative to Fig. 1.

Fig. 3 shows a modification of the direct-current valve structure of Fig. 1 or 2 to suit it to operation at one-half the voltage.

Fig. 4ª shows the control electrode circuits for the direct-current valve structure of the converter of Fig. 1; Fig. 4ᵇ shows the control electrode circuits for the alternating-current valve structure of the converter of Fig. 1.

Fig. 5ª shows an elevation in section of the complete valve structure of Fig. 1; Fig. 5ᵇ shows a plan in section corresponding to Fig. 5ª.

Fig. 6 is a detail in plan and elevation of the valve structure of Figs. 5ª and 5ᵇ.

Fig. 7 shows a mechanical arrangement of the control system corresponding to Figs. 4<sup>a</sup> and 4<sup>b</sup>, which gives the induction motors speed-torque characteristics like those of a direct-current series motor.

Referring to Fig. 1 or Fig. 2, direct-current power is received from a trolley 300, is converted into alternating-current power of moderately high frequency in the direct-current valve system 301 and associated transformer 302, or transformer 312, is then converted into polyphase alternating-current power of low variable frequency in the alternating-current valve system 303 or 313, and is finally supplied over lines 304 to squirrel-cage induction motors 305. The moderately high frequency in the intermediate circuit should be considerably higher than the low frequency of the output circuit and will ordinarily be of the order of a few hundred or a few thousand cycles per second. The voltages of the input and output circuits may be of the order of a few thousand volts. The shunt condensers $C_y$ and $C'_y$ are for the purpose of absorbing current harmonics. The series impedance afforded by the leakage reactance of the transformer absorbs voltage harmonics and also serves to limit the current to a safe value when the motors are at standstill at very low frequency. The principles and details of these circuits are more fully described in my patent application previously referred to.

Fig. 3 shows how the direct-current valve converters of Figs. 1 and 2 may be externally re-connected for operation at half voltage. The control for the lower six valves must be reversed in phase, relative to that in Figs. 1 and 2.

Fig. 4<sup>a</sup> gives the control connections for the direct-current valve converter of Fig. 1; and Fig. 4<sup>b</sup> gives the control connections for the alternating-current valve converter of the same figure. The valve structures 301 and 303 are of the magnetically guided, electrostatically controlled, thermionic type (a structure of which is shown in Figs. 5<sup>a</sup>, 5<sup>b</sup> and 6), each valve having a separate grid represented in the conventional way. To give the rapid variation in grid potential required for highly efficient valve operation, it is necessary to supply large momentary currents to the electrostatic capacities of the grids. This is accomplished by suddenly charging the grids from the reservoir condenser $C'_r$ or $C''_r$ through a control valve 401 or 403, the grid of which is controlled by a commutator, 411 or 413. In order that the same control valve may be used successively for all grids, a selector commutator 421 or 423 is employed.

Considering Fig. 4<sup>a</sup> in detail, the selector commutator 421 has four conducting segments, the two shorter of which are connected through slip-rings across the reservoir condenser $C'_r$ when the control valve 401 closes. The two longer segments are connected through slip-rings to a rectifier 431 which maintains one positive, the other negative, with respect to the neutral point $N'$ of the direct-current valve converter. The grid of the control valve 401 is maintained negative by the negative small valve rectifier 441 except when the circuit is closed at the control commutator 411, when the grid is made positive by the positive small rectifier 451. When the grid is negative, of course the control valve 401 is open and when the grid is positive the valve is closed. Now consider the action with respect to the grids $G_4$ and $G'_4$ beginning at the instant shown in the figure. The control valve has just been closed by the closing of the circuit at the control commutator 411. The brush 464 at the right of the selector commutator 421 then connects the grids $G_4$ and $G'_4$ to the positive side of condenser $C'_r$ through the control valve 401. At the same time the brush 461 at the left of the selector commutator connects the grids $G_1$ and $G'_1$ (each through a biasing rectifier $B_1$ and $B'_1$) to the negative side of $C'_r$. This action took place suddenly when the control valve was closed and a relatively large current momentarily was supplied by the reservoir condenser $C'_r$ to charge the capacity of $G_4$ and $G'_4$ in series with the capacity of $G_1$ and $G'_1$. As the commutators rotate in a counter-clockwise direction the brush 464 spans over the insulation between the short segment and the long segment marked "+". At the same time the brush 461 connects the other short segment momentarily to the long segment marked "−". The control valve 401 being still closed, the reservoir condenser $C'_r$ is thus connected across rectifier 431 and is recharged. Shortly thereafter the contact on the control commutator 411 is broken and the control valve then opens, leaving the condenser $C'_r$ charged and on open circuit, ready for charging the next set of grids $G_3$, $G'_3$, $G_2$, $G'_2$. For nearly half a revolution the grids $G_4$ and $G'_4$ are directly connected through the "+" segment to the positive terminal of the rectifier 431, and the grids $G_1$ and $G'_1$, in series with $B_1$ and $B'_1$ respectively, are directly connected through the "−" segment to the negative terminal of 431. When the brushes 464 and 461 leave the long segments, the short segments are temporarily isolated because the control valve 401 is then open; the grids, being insulated, retain their charge and their potential for a short time. Control valve 401 is then closed (by having its grid made positive through another contact on 411) and a current is suddenly supplied by $C'_r$ to reverse the potentials of the grids.

As the system is six-phase there are six valve operations per cycle, requiring six equally spaced contacts on the control commutator 411 and six equally spaced brushes on the selector commutator 421, the commutators being directly connected mechanically, as indicated by the dotted line. Of course the commutators may be constructed to operate at one-half or one-third of the speed by multiplying their contacts by two or three, respectively.

The potentials of the evenly numbered grids are required to be positive or negative with respect to the central main electrode, which forms the neutral point N' of the direct-current system; and this result is attained as described above by having N' connected to the neutral point of the rectifier 431. On the other hand, the potentials of the grids $G_1$, $G_3$ and $G_5$ are required to be positive or negative with respective to the upper (positive) electrode; so these grids each require a positive bias with respect to the neutral point, this bias being obtained through the rectifiers $B_1$, $B_3$ and $B_5$. Similarily the grids $G'_1$, $G'_3$ and $G'_5$ are given a negative bias, by means of the rectifiers $B'_1$, $B'_3$ and $B'_5$.

The rectifiers 431, 441, 451 and the B's of Fig. 4ª, as well as 433, 443 and 453 of Fig. 4ᵇ, have emissive cathodes and non-emissive anodes. The grids are constantly positive with respect to the anodes and alternately positive and negative with respect to the cathodes. All of these rectifiers are supposed to be supplied with voltages of rectangular wave form such as may be obtained from one of the direct-current valves. The rectifiers 441, 451, 443, 453 and the B's take care of such small powers that they are best made single; while each part of the rectifiers 431 and 433 takes care of larger powers and is made double. The coils connected to the B rectifiers may be secondaries of the same transformers which supply other rectifiers. The control valve circuits $C'_r$, 401, 411, 441 and 451, and the bias circuits $B^1$, $B^2$, etc., should be arranged with low capacity to ground, as their potentials are required to change suddenly.

Considering Fig. 4ᵇ in detail, selector commutator 423 is arranged similarly to that of Fig. 4ª except that the "+" segment covers a little less than one-third of a circumference and the "—" segment covers a little less than two-thirds. The result is that the grids of the alternating-current valve system 303 are positive for one-third and negative for two-thirds of a cycle. As the neutral point N'' of the output circuit is connected to the neutral point of the rectifier 433, and as the potentials of the grids are required to be positive or negative with respect to the output electrodes (connected to the lines 304), there is inserted in series with each grid the secondary of a one-to-one transformer whose primary is connected between N'' and the corresponding output electrode. These transformers cause the potentials of the grids to follow the potentials of the corresponding output electrodes. Except for the differences just described, the operation of the control system in Fig. 4ᵇ is like that in Fig. 4ª.

The frequency of the intermediate circuit (302, etc.) of Fig. 1 or Fig. 2 is the control frequency of the direct-current valve converter. The output frequency is the difference between this frequency and the control frequency of the alternating-current valve converter of Fig. 4ᵇ. The output frequency is therefore equal to the difference in speed between the direct-current control commutators (411 and 421) and the alternating-current control commutators (413 and 423), or to a multiple of this speed in case the number of segments of these commutators has been multiplied. In place of having the commutators operate at different speeds, they are preferably mechanically connected to operate at the same speed, as by shaft 308 and motor 307 in Fig. 7, and one set of control brushes (461—466 or 471—476) is revolved at a speed corresponding to the desired output frequency.

In case such a cascade valve converter were to be used to supply synchronous motors, the output frequency would be the rotational frequency of these motors and would therefore directly determine their speed. This speed would be controlled by the speed of a pilot motor driving one set of control brushes. However, the squirrel-cage induction motors, which have been chosen as best suited for electric traction purposes, run at a speed less than synchronous speed by the slip. If the relative speed at the control commutators is not allowed to vary with the load on the motors, the latter will have speed-torque characteristics similar to direct-current shunt motors with field control or armature voltage control; and speeds will be set approximately by the speed setting of the commutators, but will drop off slightly as load is added. On the other hand, if one set of control brushes, as 461—466 (of course with the brush on 411), is driven positively by the rotor of the power induction motor, as motor 305 in Fig. 7, the speed being stepped up in a ratio equal to the number of pairs of poles (for the number of segments shown in the figure), and the other set of brushes instead of being stationery is allowed to revolve slowly, as by pilot motor 306 in Fig. 7, then the speed-torque characteristics of the power motor will be similar to those of a direct-current series motor. The theory of this case is given in the following paragraphs:

For simplicity of discussion suppose the power motor to be bipolar and the commutators bipolar also (as in Figs. 4ª and 4ᵇ, where corresponding segments are not repeated). Let us use the following notation:

$n$, motor speed, or the speed of the direct-current control brushes, 461—466;
$n_s$, motor slip speed;
$n_b$, speed of alternating-current control brushes, 471—476;
$n_c$, speed of control commutators 411, 421, 413, 423;
$E$, motor voltage;
$I$, motor current;
$\Phi$, motor flux;
$r$, resistance of main circuit;
$D$, motor torque;
$k$, $k'$, etc., constants.

Then the intermediate frequency is equal to $(n_c-n)$; the alternating-current control frequency is $(n_c-n_b)$; and the output frequency is $(n-n_b)$, which is equal to the synchronous speed. Hence the slip is $$n_s = (n-n_b) - n = -n_b.$$

That is, the motor slip is numerically equal to the speed of the alternating-current control brushes, and is therefore capable of independent control, as by controlling the speed of motor 306 in Fig. 7.

Now approximately the following relations obtain:

$E = k\Phi(n+n_s) + Ir$; $I = k'\Phi n_s$; and $D = k''I\Phi$.

Hence $$E = \frac{k_1 I(n+n_s)}{n_s} + Ir; \text{ and } D = \frac{k_2 I^2}{n_s}.$$

Finally $$D = k_2 n_s \left(\frac{E}{k_1 n + k_1 n_s + r n_s}\right)^2.$$

Comparing a direct-current series motor, $E = kn\Phi + Ir$; $I = k''\Phi$; and $D = k''I\Phi$.

Hence $$E = k_3 n I + Ir; \text{ and } D = k_4 I^2.$$

Finally $$D = k_4 \left(\frac{E}{k_3 n + r}\right)^2.$$

With $n_s$ constant above, the two equations are of the same form, showing the induction motor controlled as above to have characteristics like the direct-current series motor.

The mechanical arrangement for obtaining the relations described above is shown in Fig. 7. Brushes 461—466, together with the brush on 411, are driven positively by the power motor 305; brushes 471—476, together with the brush on 413, are driven by the pilot motor 306; and all commutators are mechanically connected by shaft 308 and driven by motor 307. The connections from the moving brushes and commutator segments to their respective stationary circuits may be made in the usual way through slip rings and leads placed in hollow shafts, as indicated.

The ordinary direct-current motor is properly described as a synchronously commutated synchronous motor, or simply a direct-current synchronous motor. The induction motors controlled as above are correspondingly described as non-synchronously commutated induction motors, or simply direct-current induction motors. A more elementary form of direct current induction motor would be one having an ordinary commutated armature and a field structure equipped with a squirrel-cage winding instead of a direct-current field winding. If the brushes were then slowly revolved, magnetic flux would be produced which would also slowly revolve and would induce currents in the squirrel-cage, as in an ordinary induction motor. The arrangement of this invention accomplishes essentially this result in a more elaborate but more satisfactory way.

The direct-current valve system 301 and the alternating-current valve system 303 of Fig. 1 are shown combined in a single structure in Figs. 5ᵃ and 5ᵇ, a detail being shown in Fig. 6. Each valve system consists of a highly evacuated metal vessel 501 and 503 containing main electrodes 504 and control electrodes in the form of grids 505. All main electrodes are electron-emissive over the portions 506 in the central space between grid conductors, the heat developed by the losses maintaining the proper temperature for emission. The valve systems are placed in a constant magnetic field produced by the iron core 507 excited by the coils 508, 509, 510, the lines of magnetic flux having the paths indicated by the dotted lines and serving to guide the electrons so that they do not reach the grid conductors. The action is more fully discussed in my patent application previously referred to.

I claim:

1. A system for operating an alternating-current motor from a source of direct-current power, which comprises a cascade electrostatically controlled valve converter which converts the direct-current power first into high-frequency power and then into low-frequency polyphase power for supply to the motor, two positively connected control commutators for said valve converter, a set of brushes for each of said commutators, and means for driving one set of brushes relatively to the other, the relative motion determining the frequency supplied to the motor.

2. A system for attaining in an induction motor speed-torque characteristics like those of a direct-current series motor, which comprises a source of direct-current power, an electrostatically controlled valve converter which converts the direct-current power into polyphase power for supply to the motor, control means having an independent frequency, second control means having a frequency dependent on the motor speed, and means for making the output frequency of said valve converter equal to the sum of said frequencies.

3. A system for attaining in an induction motor speed-torque characteristics like those of a direct-current series motor, which comprises a source of direct-current power, a cascade electrostatically controlled valve converter which converts the direct-current power first into high-frequency power and then into low-frequency polyphase power for supply to the motor, two positively connected control commutators for said valve converter, a set of brushes for one of said commutators driven by the motor, and a set of brushes for the other of said commutators driven independently, whereby the frequency supplied to the motor is the sum of a frequency proportional to the speed of the motor and an independent frequency.

4. A system of motor speed control, which comprises a source of direct-current power, an alternating-current motor, a group of electrostatically controlled valves associated with said source of direct-current power, an intermediate circuit connecting said group of valves to a second group of electrostatically controlled valves, an output circuit connecting said second group of valves to said motor, a commutator associated with the control electrodes of the first mentioned group of valves, a second commutator associated with the control electrodes of the second group of valves, brushes associated with each commutator, means moving said commutators relative to their respective brushes at speeds whose difference is adjustable and relatively small, said difference corresponding to the frequency of the current supplied to said motor which determines the speed thereof, and a reservoir condenser associated with each commutator, whereby the control electrodes are rapidly changed in potential.

5. A system of motor speed control having high efficiency, which comprises a source of power, an alternating-current motor, an electrostatically controlled valve converter interposed between said source of power and said motor, each valve of said converter having two electron-emissive main electrodes and a non-emissive control electrode, means for preventing electrons emitted by the main electrodes from reaching the control electrodes, a selector commutator associated with the control electrodes, a source of high positive and negative potential connected through said commutator to the control electrodes, whereby electron streams between the main electrodes are alternately established copiously and interrupted completely, a reservoir condenser connected through said commutator to the control electrodes, whereby the control electrodes are rapidly changed in potential, brushes associated with said commutator, means moving said commutator relative to said brushes at an adjustable speed, whereby the current supplied to the motor is adjusted in frequency and thence the speed is controlled, shunt capacity absorbing reactively differences between the input and output currents of the valve converter, and series inductance absorbing reactively differences between the input and output voltages of the valve converter, whereby such current and voltage differences are not required to be absorbed by the valves themselves.

6. A system for attaining in an induction motor speed-torque characteristics like those of a direct-current series motor, which comprises a source of direct-current power, a cascade electrostatically controlled valve converter which converts the direct-current power first into high-frequency power and then into low-frequency polyphase power for supply to the motor, two positively connected control commutators for said valve converter, a set of brushes for each of said commutators, and means for driving one set of brushes relatively to the other at a speed which is determined as the sum of a speed proportional to the motor speed and an independently controlled speed.

7. In an induction motor operated from a source of direct-current power, the method of attaining speed-torque characteristics like those of a direct-current series motor, which comprises converting the direct-current power into polyphase alternating-current power whose frequency is the sum of two components, one component corresponding to and mechanically derived from the speed of the motor, and the other component corresponding to the desired slip of the motor and fixed independently of the speed of the motor.

8. In an induction motor operated from a source of direct-current power, the method of attaining speed-torque characteristics like those of a direct-current series motor and of controlling the speed, which comprises converting the direct-current power into polyphase alternating-current power whose frequency is the sum of two components, one component corresponding to and mechanically derived from the speed of the motor, and the other component corresponding to the desired slip of the motor and controlled by means rotating independently of the motor.

In testimony whereof I affix my signature.

LOUIS A. HAZELTINE.